United States Patent [19]

Aridas et al.

[11] Patent Number: 5,579,371
[45] Date of Patent: Nov. 26, 1996

[54] COMMON CHANNEL SIGNALING NETWORK APPLICATIONS PLATFORM

[75] Inventors: James Aridas; Judith L. Culpepper; Kathleen A. Giessuebel, all of Virginia Beach, Va.; Dennis A. Perkinson, West Chester, Pa.; Nancy L. Sweet; Karen Wolff, both of Virginia Beach, Va.

[73] Assignee: Unisys Corporation, Blue Bell, Pa.

[21] Appl. No.: 344,316

[22] Filed: Nov. 22, 1994

[51] Int. Cl.[6] .......................... H04M 3/22; H04M 15/60; H04M 3/00; H04J 3/12
[52] U.S. Cl. .......................... 379/34; 379/112; 379/230; 370/110.1
[58] Field of Search .................... 379/10, 11, 12, 379/13, 15, 22, 34, 133, 111, 112, 113, 114, 115, 119, 120, 134, 135, 126, 207, 220, 230; 370/58.2, 68.1, 110.1, 561.1; 395/311, 858, 200.02, 200.12, 200.15; 340/825.07; 364/949.91

[56] References Cited

U.S. PATENT DOCUMENTS

| | | |
|---|---|---|
| 5,008,929 | 4/1991 | Olsen et al. ..................... 379/115 |
| 5,218,632 | 6/1993 | Cool ................................ 379/119 |
| 5,375,159 | 12/1994 | Williams ......................... 379/22 |
| 5,430,719 | 7/1995 | Weisser, Jr. ..................... 370/58.2 |
| 5,488,648 | 1/1996 | Womble .......................... 379/34 |

Primary Examiner—Wellington Chin
Assistant Examiner—Paul Loomis
Attorney, Agent, or Firm—Albert B. Cooper; Mark T. Starr

[57] ABSTRACT

A platform for connecting to a CCS7 network for supporting concurrently running CCS related applications. Copies of the SUs flowing through the network are sent to the platform where the FISUs, LSSUs and MSUs are filtered to provide the desired SU type for each of the applications. The MSUs are filtered by MSU category and MSU type within category into groups of MSUs of particular interest to the applications, respectively. Linked lists of filter elements associated with the respective linksets of the CCS7 network perform the filtering by comparing category and type fields to the MSU categories and types to form the groups. Filter change data received at a user interface is utilized to modify the filters.

8 Claims, 13 Drawing Sheets

LINK FILTER ARRAY ELEMENT

| TYPE | FIELD | SIZE | DESCRIPTION |
|---|---|---|---|
| LINKSET FILTER | FIRST | 4 | POINTER TO FIRST LINKSET-FILTER ELEMENT 112 — 120 |

LINKSET FILTER ELEMENT

| TYPE | FIELD | SIZE | DESCRIPTION |
|---|---|---|---|
| INTEGER | SLS INDEX | 2 | SLS INDEX NUMBER (IN SYSTEM) — 121 |
| FILTER ELEMENT | FIRST | 4 | POINTER TO FIRST FILTER ELEMENT 111 — 122 |

FILTER ELEMENT

| TYPE | FIELD | SIZE | DESCRIPTION |
|---|---|---|---|
| CHAR | APP | 10 | 8 CHARACTER APPLICATION ID — 123 |
| CHAR | CAT | 1 | MESSAGE CATEGORY CODE — 124 |
| CHAR | MSGTYPES | 32 | BIT MAP OF MSG TYPES 0 = OFF  1 = ON — 125 |
| FILTER ELEMENT | NEXT | 4 | POINTER TO NEXT FILTER ELEMENT 111 — 126 |

APPLICATION MESSAGE

| TYPE | FIELD | SIZE | DESCRIPTION |
|---|---|---|---|
| BUFDAT | HEADER | 16 | HEADER FOR MESSAGE |
| CHAR | MSG CAT | 1 | MESSAGE CATEGORY |
| CHAR | MSG TYPE | 1 | MESSAGE TYPE |
| INTEGER | NUM OCTETS | 2 | NUMBER OF OCTETS |
| INTEGER | SLS INDEX | 2 | SIGNALING LINKSET INDEX |
| CHAR | DIRECTION | 1 | 1 = SENT  2 = RECEIVE |
| INTEGER | TIMESTAMP | 4 | TIMESTAMP OF MESSAGE |
| CHAR | DATA | 276 | SIO AND SIF OF SS7 MESSAGE |

CHANGE ELEMENT

| TYPE | FIELD | SIZE | DESCRIPTION |
|---|---|---|---|
| INTEGER | SLS INDEX | 2 | LINKSET INDEX NUMBER |
| CHAR | APP | 10 | 8 CHARACTER APPLICATION ID |
| CHAR | CAT | 1 | MESSAGE CATEGORY CODE |
| CHAR | MSGTYPES | 32 | BIT MAP OF MSG TYPES<br>0 = OFF  1 = ON |
| INTEGER | EFF TIME | 4 | NUMBER OF MILLISECONDS SINCE MIDNIGHT |
| CHAR | STATUS | 1 | 0 = PENDING<br>1 = ACTIVE |
| CHAR | ACTION | 1 | 0 = NO ACTION PENDING<br>1 = TO BE ADDED<br>2 = TO BE CHANGED<br>3 = TO BE DELETED |
| FILTER ELEMENT | NEXT | 4 | POINTER TO NEXT FILTER ELEMENT 141 |

FIG. 9

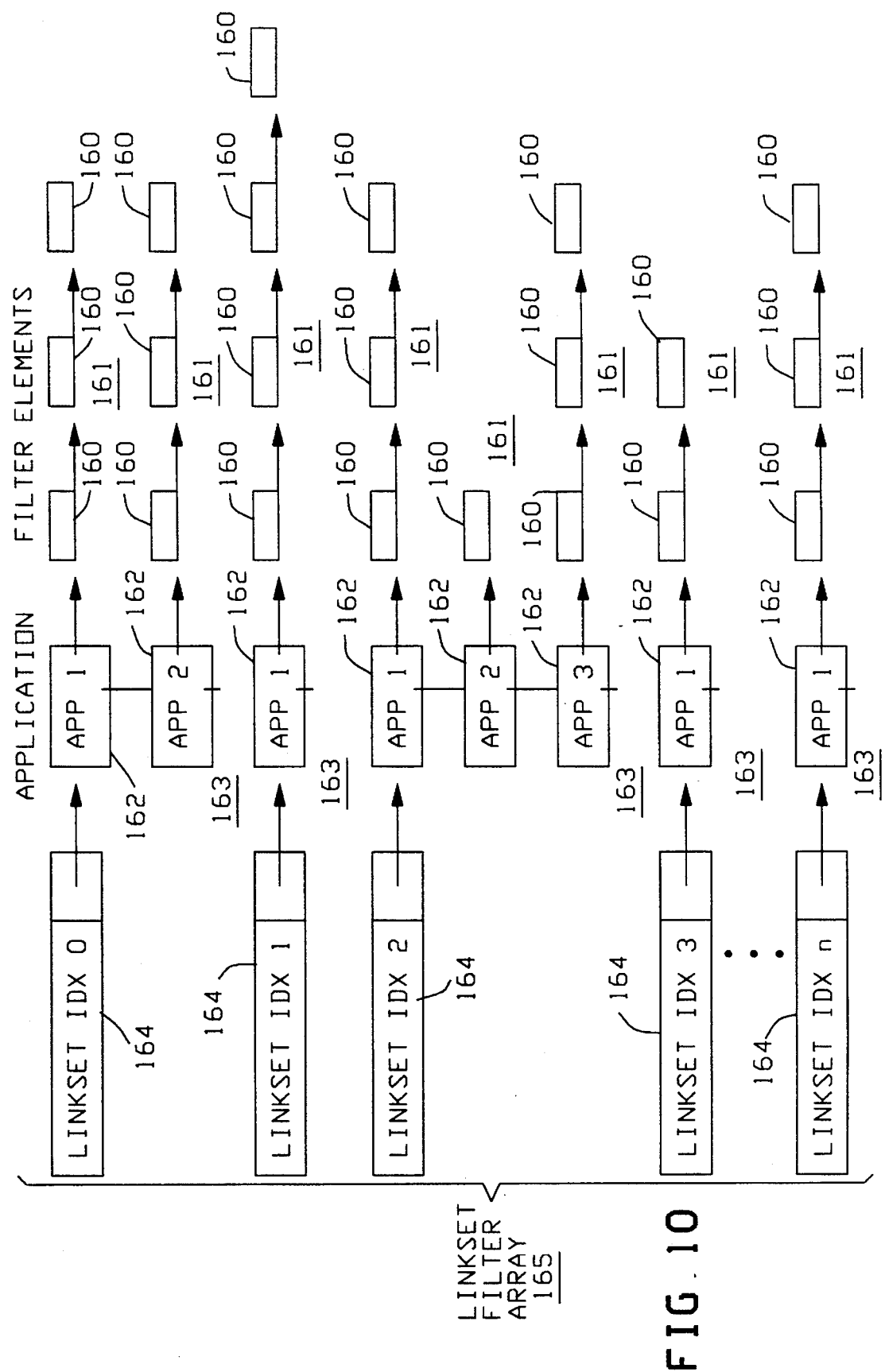

MASTER LINKSET ELEMENT

| TYPE | FIELD | SIZE | DESCRIPTION |
|---|---|---|---|
| APP ELEMENT | FIRST | 4 | POINTER TO FIRST APPLICATION ELEMENT 162 |

FIG. 11a

APP ELEMENT

| TYPE | FIELD | SIZE | DESCRIPTION |
|---|---|---|---|
| CHAR | APP | 10 | 8 CHARACTER APPLICATION ID |
| CHAR | APP STATUS | 1 | 0 = OFF<br>1 = ON | APPLICATION STATUS |
| CHAR | ACTION | 1 | 0 = NO ACTION PENDING<br>1 = TURNING ON<br>2 = TURNING OFF |
| INTEGER | EFF TIME | 4 | NUMBER OF MILLISECONDS SINCE MIDNIGHT |
| FILTER ELEMENT | FIRST | 4 | POINTER TO FIRST FILTER ELEMENT 160 |
| APP ELEMENT | NEXT | 4 | POINTER TO NEXT APPLICATION ELEMENT 162 |

FIG. 11b

MASTER FILTER ELEMENT

| TYPE | FIELD | SIZE | DESCRIPTION |
|---|---|---|---|
| CHAR | CAT | 1 | MESSAGE CATEGORY CODE |
| CHAR | MSGTYPES | 32 | BIT MAP OF MSG TYPES<br>0 = OFF 1 = ON |
| INTEGER | EFF TIME | 4 | NUMBER OF MILLISECONDS SINCE MIDNIGHT |
| CHAR | STATUS | 1 | 0 = PENDING<br>1 = ACTIVE |
| CHAR | ACTION | 1 | 0 = NO ACTION PENDING<br>1 = TO BE ADDED<br>2 = TO BE CHANGED<br>3 = TO BE DELETED |
| FILTER ELEMENT | NEXT | 4 | POINTER TO NEXT FILTER ELEMENT 160 |

FIG. 11c

SERVER LINKSET ELEMENT

| TYPE | FIELD | SIZE | DESCRIPTION |
|---|---|---|---|
| FILTER ELEMENT | FIRST | 4 | POINTER TO FIRST FILTER ELEMENT 190 |

FIG. 13a

SERVER FILTER ELEMENT

| TYPE | FIELD | SIZE | DESCRIPTION |
|---|---|---|---|
| CHAR | APP | 10 | 8 CHARACTER APPLICATION ID |
| CHAR | CAT | 1 | MESSAGE CATEGORY CODE |
| CHAR | MSGTYPES | 32 | BIT MAP OF MSG TYPES 0 = OFF 1 = ON |
| FILTER ELEMENT | NEXT | 4 | POINTER TO NEXT FILTER ELEMENT 190 |

FIG. 13b

| APP1 LINKSET Filter Message Types | |
|---|---|
| | Help |

220 — LINKSET: LK060054

221 — Message Category: ISUP

| Message Type | Monitoring (ON/OFF) |
|---|---|
| Address Complete | ON |
| Answer | ON |
| Blocking | OFF |
| Blocking Ack | OFF |
| Call Progress | OFF |
| Circuit Group Blocking | OFF |
| Circuit Group Blocking Ack | OFF |
| Circuit Group Reset | OFF |
| Circuit Group Reset Ack | OFF |
| Circuit Group Unblocking | OFF |
| Circuit Group unblocking Ack | OFF |
| Circuit Query | OFF |
| Circuit Query Response | OFF |
| Circuit Reservation ack Msg | OFF |
| Circuit Resrvation Message | OFF |
| Circuit Validation Response | OFF |

COMMON CHANNEL SIGNALING NETWORK APPLICATIONS PLATFORM

BACKGROUND OF THE INVENTION

1. Field of the Invention

The invention relates to the telecommunications Common Channel Signaling (CCS) network particularly with respect to an applications platform therefor.

2. Description of the Prior Art

Telephone systems throughout the Unites States presently include a CCS network overlay on the conventional Public Switched Telephone Network (PSTN). The CCS network is preferably implemented utilizing the Signaling System No. 7 (SS7) protocol and is often referred to as the Common Channel Signaling System No. 7 (CCS7) network.

The CCS7 network is a packet switched network that comprises nodes called Signaling Points (SP) and digital links that interconnect the SPs. The SPs are of three basic types; namely, the Signaling Transfer Point (STP), the Service Control Point (SCP), and the Service Switching Point (SSP). The PSTN communicates with the CCS7 network via the SSPs located at the telephone company switching offices such as the end offices and tandem offices. The SSPs are connected to the STPs via digital links and an STP is coupled to an SCP via digital links. The SCPs are databases containing telephone company, subscriber and call related data. The digital links interconnecting the SPs are formed into linksets.

CCS7 separates the signaling function that sets up and supervises a call from the switched voice/data path of the call through the PSTN. Prior to CCS7, the signaling information was carried in-band on the voice/data path.

The CCS7 network conveys data packets called SS7 Signal Units (SU) generated by the SSPs and routed by the STPs. Three types of Signal Units are specified for signaling on the CCS7 network. These are denoted as Message Signal Units (MSU), Link Status Signal Units (LSSU) and Fill-In Signal Units (FISU). CCS7 network links idle by transmitting FISUs. The LSSU conveys link status information between points of the network.

The MSU carries network information and is utilized to convey call set-up and supervision signaling. The MSU also controls transaction oriented functions such as data base queries and responses to the SCPs. An MSU can be of a particular category. For example, an ISUP MSU includes an Integrated Services Digital Network User Part and is generally utilized to transfer call set-up and supervision signaling information. An SCCP MSU includes a Signaling Connection Control Part which provides routing and management functions for transfer of messages other than for call set-up. Query and response MSUs will be of the SCCP category and will include a Transaction Capabilities Application Part (TCAP). An SCCP TCAP MSU will generally be utilized in such transaction oriented functions as queries and responses to SCPs.

An MSU of a particular category can be of a variety of types. For example, an ISUP MSU can be an Initial Address Message (IAM), a Continuity Check Message (COT), an Address Complete Message (ACM), an Answer Message (ANM), or a Release Message (REL).

Other categories of MSUs are the SCCP Unitdata and the SSCP Unitdata Service which have message types of TCAP query, TCAP response, TCAP conversation, and TCAP unidirectional.

The above discussed MSU categories and MSU types within the categories are merely exemplary. Numerous other MSU categories and MSU types are known in the SS7 protocol for performing a variety of functions.

Systems are known in the prior art that couple to the CCS7 network for performing specific dedicated applications. For example, an article in *TELECOMMUNICATIONS* of July 1987, volume 21 number 7, pages 67–71, entitled "SS7 Testing Tools" by B. Nelson, describes equipment for testing the CCS7 network. The equipment is manufactured by Hewlett-Packard as the Signaling Test Set HP37900D. This equipment can record information at a network point and limited analysis can be performed thereon in an ad hoc fashion.

Another dedicated system is disclosed in U.S. Pat. No. 4,788,718 issued Nov. 29, 1988, entitled "Call Data Collection And Modification Of Received Call Distribution". The disclosed system collects call data from an STP link and processes the call data to perform traffic analysis.

Another such dedicated system is disclosed in U.S. Pat. No. 5,008,929 issued Apr. 16, 1991, entitled "Billing System For Telephone Signaling Network". The system of said U.S. Pat. No. 5,008,929 captures MSUs received by an STP and processes the MSUs to identify, as a service provider, a telephone company that transports an MSU, or a telephone company that provides call data for an MSU, for example, in response to an MSU query. The MSUs are also processed to identify as a recipient for the service, the telephone company that formulated the MSU.

It is appreciated that a telephone company such as an RBOC cannot readily obtain knowledge of the Signal Unit traffic flowing through its CCS network. As discussed, a dedicated system can be designed and deployed to connect to the network to analyze the Signal Unit traffic in accordance with a specifically desired "built-in" application. This approach is wasteful of interface and processing resources, particularly when plural and diverse applications are desired. Analysis of the traffic is done off-line in an ad hoc fashion by the department of the telephone company that desires the traffic data.

SUMMARY OF THE INVENTION

The present invention provides a platform for supporting plural application software programs related to processing SS7 Signal Units flowing through the CCS network for extracting and deriving various types of specialized information therefrom, respectively. The platform receives SS7 Signal Units copied from the CCS network and screens and filters the Signal Units into respective subsets that are of particular interest to the plural applications running on the platform. The filtered subsets of Signal Units are directed to the applications, respectively, for processing. Thus, the applications run independently with respect to each other. Generally, FISUs are discarded prior to filtering and LSSUs will be screened prior to filtering and directed to highly specialized applications that require the LSSUs. The MSUs that remain after screening out the FISUs and LSSUs are then filtered by MSU category, and type within category, into the subsets that are appropriate for the respective applications. These filtered subsets of MSUs are then directed to the respective applications for the specialized processing for which the applications are designed. The applications can run concurrently to process the respective subsets of filtered MSUs.

In the preferred embodiment, input ports of the CCS network interface of the platform receive T1 channelized SS7 Signal Units copied from the links and linksets of the CCS network. The filtering is preferably performed on a per linkset basis where the MSUs are first grouped by linkset and then filtered for category and type. A further embodiment may perform the filtering on a per link basis.

External control of the filtering functionality is provided through a user interface whereby a user can specify desired filtering in accordance with application, linkset, Signal Unit type, MSU category and MSU type. For example, a user, such as an application owner, can access the platform for filter control from a terminal at an administration site.

BRIEF DESCRIPTION OF THE DRAWINGS

FIG. 4 is a diagram of the link message data structure utilized for input SU formatting in the Network Interface Platform of the CCS-IP of FIG. 3.

FIG. 5 is a diagram of the linked structure of the MSU filters of the Network Interface Platform of the CCS-IP of FIG. 3.

FIGS. 6a, 6b and 6c are diagrams of the data structures of elements utilized in the MSU filtering structure of FIG. 5. FIGS. 6a, 6b and 6c illustrate the link filter array element, linkset filter element and filter element, respectively.

FIG. 9 is a diagram of the data structure of the filter change element utilized in the filter change structure of FIG. 8.

FIG. 10 is a diagram of the linked filter structure of the master filter structure and elements of the master station of the CCS-IP of FIG. 3.

FIGS. 11a, 11b and 11c are diagrams of the data structures of the elements of the master filter structure and elements of FIG. 10. FIGS. 11a, 11b and 11c illustrate the master linkset element, application element and master filter element, respectively.

FIGS. 13a and 13b are diagrams of the data structures of the elements of the server filter structure and elements of FIG. 12. FIGS. 13a and 13b illustrate the server linkset element and server filter element, respectively.

FIG. 15 is an illustration of a user interface window displayed on the master console of FIG. 3 for configuring the filter MSU type pursuant to MSU category, application and linkset.

DESCRIPTION OF THE PREFERRED EMBODIMENT

Figure 1:
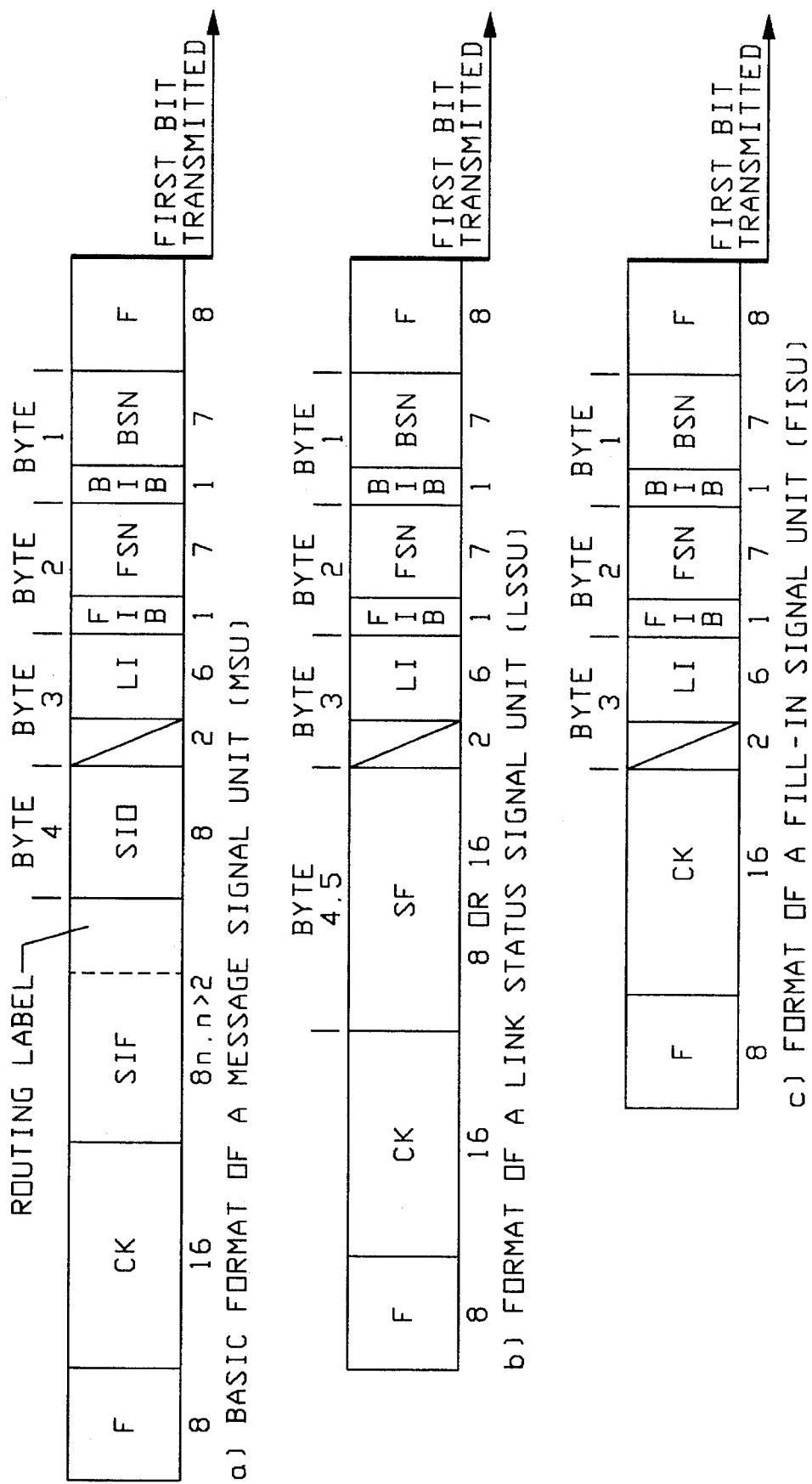
FIG. 1 is a diagram illustrating the formats of the SS7 Signal Units.
Figure 2:
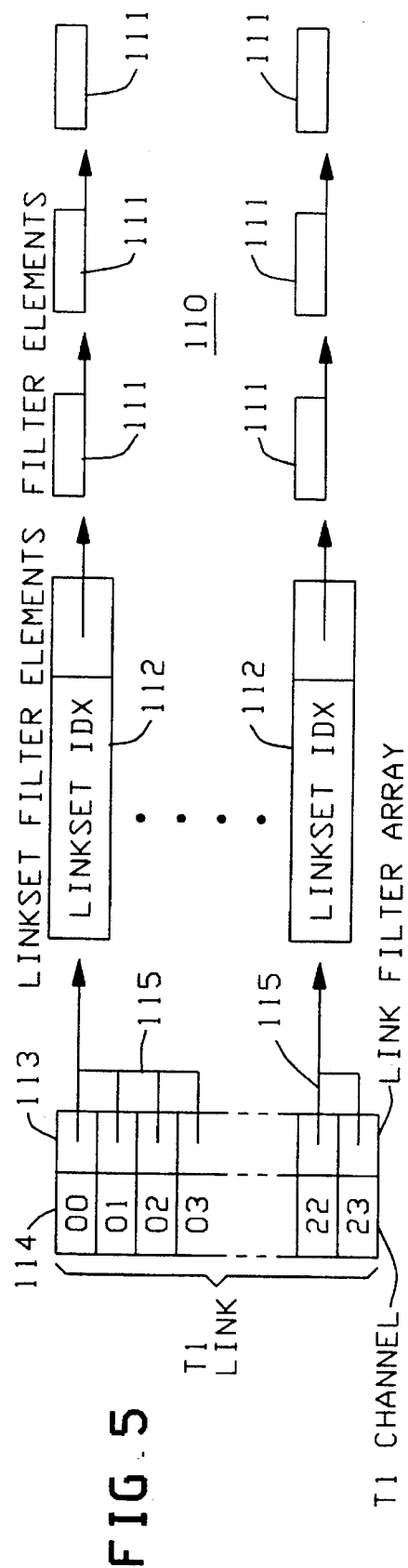
FIG. 2 is the standard routing label which is placed at the beginning of the SIF of the MSU of FIG. 1.

Referring to FIGS. 1 and 2, FIG. 1 illustrates the formats of the MSU, the LSSU and the FISU. FIG. 2 illustrates the standard telephone label format of the SIF of the MSU. These formats are in accordance with North American (ANSI) Standards as promulgated by Bell Communications Research in Bellcore TR-NWT-000246, Issue 2, June 1991, Revision 3, December 1993. The indicated fields are as follows:

BIB=Backward indicator bit
BSN=Backward sequence number
CK=Check bits
DPC=Destination point code
F=Flag
FIB=Forward indicator bit
FSN=Forward sequence number
LI=Length indicator
N=Number of octets in SIF
OPC=Originating point code
SF=Status field
SIF=Signaling information field
SIO=Service information octet
SLS=Signaling linkset selection.

The label of FIG. 2 has a length of 56 bits and is placed at the beginning of the SIF. The DPC indicates the signaling point for which the message is intended, while the OPC indicates the signaling point which is the source of the message. The SLS field is used by the signaling system to balance Signal Unit routing for load sharing.

The LI differentiates between the three types of Signal Units as follows: the FISU has an LI of 0; the LSSU has an LI of 1 or 2; the MSU has an LI greater than 2. The SIO contains a Service Indicator (SI) which identifies the message category of the MSU (ISUP, SCCP, etc.) The SIF contains an identification of the message type within the message category. For example, an ISUP message can be of type IAM, ACM, etc. For message category ISUP, the tenth byte of the SIF identifies the message type and for message category SCCP the message type is found at byte 8 of the SIF. The TCAP and SCCP parts are contained in the SIF.

Figure 3:
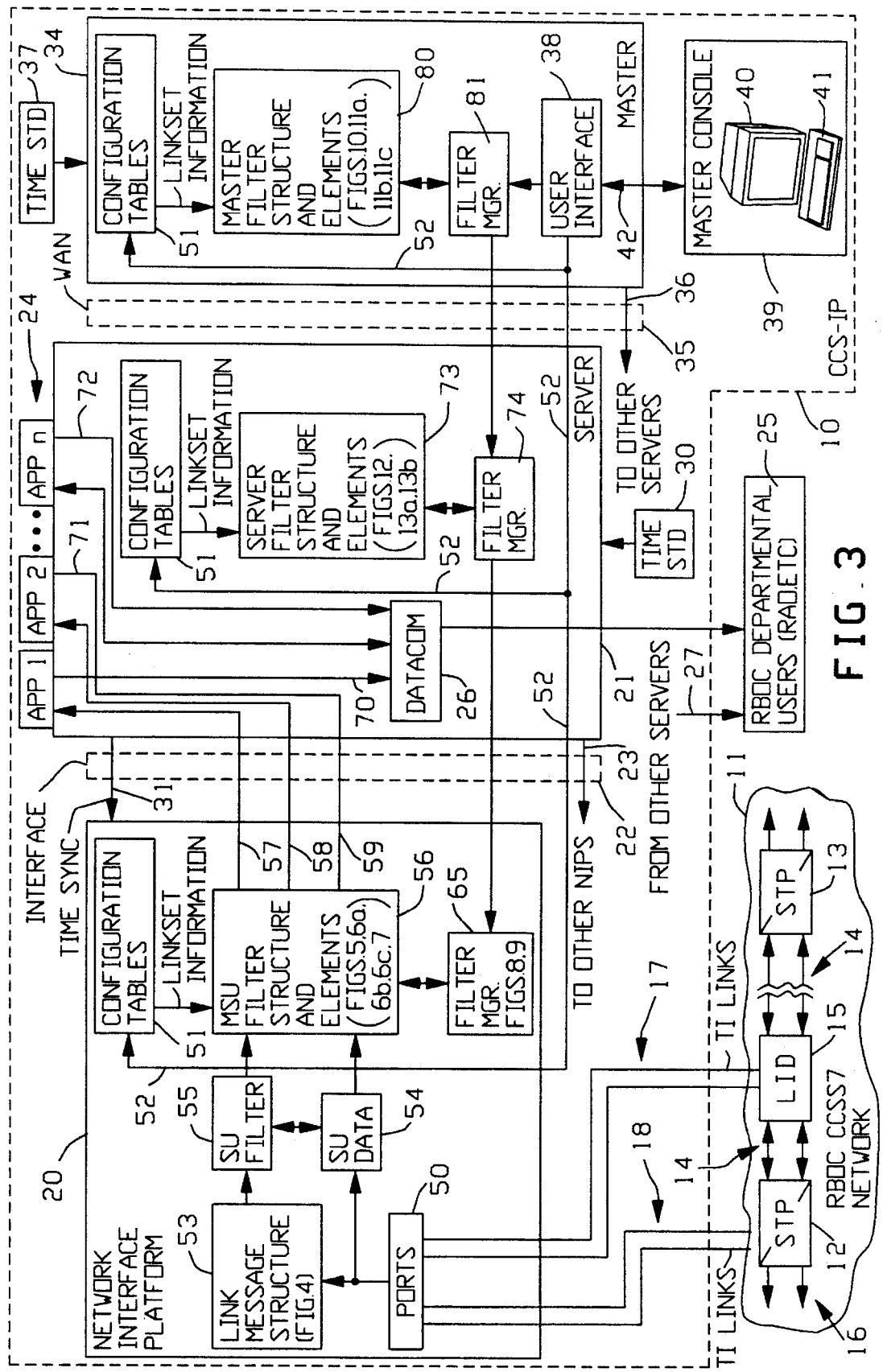
FIG. 3 is a schematic block diagram of the Common Channel Signaling—Information Platform (CCS-IP) of the present invention.

Referring to FIG. 3, a schematic block diagram of the CCS-IP 10 of the present invention is illustrated. The CCS-IP 10 is shown connected to the CCS7 network 11 of an RBOC but could be utilized with any CCS7 network. The network 11 comprises an arbitrary set of Signaling Points interconnected by digital linksets. For example, the network 11 includes STPs 12 and 13 interconnected by a digital linkset 14. A Link Interface Device (LID) is connected to the linkset 14 for copying SUs transported between STPs 12 and 13. STP 12 is the near end point of the linkset 14 and STP 13 is the far end point. The STP 12 also terminates a linkset 16 that could terminate at another point within the network 11 or at a point outside the network. The far end terminating point of the linkset 16 could be another STP or an SSP in an End Office or Tandem Office. The SSP may or may not be owned by the RBOC that owns the network 11. For example, the linkset 16 may terminate at an SSP in an End Office of an Alternate Exchange Carrier (AEC). Additionally, linksets terminating at the STP 12 or the STP 13 can be utilized for connections to SCPs (not shown).

The LID 15 duplicates the SUs traversing the linkset 14 and provides the duplicates thereof in channelized T1 format on T1 links 17. Although only one linkset 14 with the associated LID 15 is illustrated, it is appreciated that groups of, or all of the linksets of the network 11 may be similarly configured with LIDs to provide copied SUs on T1 links similar to the links 17. For example, T1 links 18 may provide SUs from these other linksets. Numerous commercial devices are available for implementing the LID 15. For example, the DEXCS manufactured by DSC Inc. may be utilized for this purpose.

Although the LID 15 is illustrated connected adjacent to an STP, it is appreciated that the CCS-IP 10 can be connected with respect to other SPs of the network.

The CCS-IP 10 is comprised of a plurality of Network Interface Platforms (NIP), a representative one of which is identified by reference numeral 20. The NIP 20 is a front end processing system for the CCS-IP 10 utilized to terminate T1 links, such as links 17 and 18.

The CCS-IP 10 also includes a plurality of application data servers, a representative one of which is identified by reference numeral 21. The server 21 may be implemented by any suitable high end data processing system, such as the U6000 departmental server available from Unisys Corporation of Blue Bell, Pa. The NIP 20 and the server 21 are shown intercoupled through a conventional interface 22 in a host/client relationship. The interface 22 could be implemented on any high performance bus such as Ethernet, Multibus II, VME or SCSI. Communication between the server 21 and other NIPs of the CCS-IP 10 are through such interfaces as schematically indicated at reference numeral 23.

The server 21 supports a plurality of independent applications 24 which may run concurrently. The outputs of the applications 24 are transmitted to a departmental user 25, such as the Revenue Accounting Office (RAO), of the RBOC. Communication with the departmental user 25 is through a conventional Data Communications (DATACOM) interface 26, such as X.25. The departmental user 25 receives outputs from other application data servers of the CCS-IP 10, as schematically indicated at reference numeral 27.

The server 21 receives an input from a time standard 30 to provide synchronization of clocks. The time standard 30 is preferably implemented by a Global Positioning System (GPS) Time Machine. However, a variety of other clock synchronization methods may be used. Time synchronization is provided to the Network Interface Platform 20 through the interface 22, as indicated by reference numeral 31.

The network 11 is geographically dispersed through the region controlled by the RBOC that owns the network. The CCS-IP 10 includes a plurality of servers, such as the server 21, at various sites throughout the region. Each server is coupled to one or more NIPs, such as the NIP 20, so as to connect to the various signaling linksets of the network 11. The SS7 SUs flowing through the network 11 are copied at the LIDs throughout the network and transported on the T1 links (such as links 17 and 18) which terminate at the various NIPs of the CCS-IP 10. In this manner, the CCS-IP 10 can gather information from the entire CCS7 network 11 of the RBOC. Each of the applications 24 may be distributed across several of the application data servers (such as the server 21) for processing the information in the network SUs.

The CCS-IP 10 also includes a master station 34 that may be implemented by any suitable high end data processing system such as the U6000 departmental server available from Unisys Corporation of Blue Bell, Pa. The master station 34 communicates with the application data servers, such as server 21, of the CCS-IP 10 via a Wide Area Network (WAN) 35. It is appreciated that a variety of standard communication interfaces may also be utilized for this purpose. Communication with the data servers other than server 21 is schematically indicated at 36. The master station 34 receives an input from a time standard 37 for synchronization of system clocks. The time standard 37 may also be implemented by a GPS as described with respect to time standard 30. The master station 34 and the system data servers are arranged in a host/client relationship. The master station 34 provides a centralized, single point of control for administration of the remote client data server systems.

The master station 34 includes a user interface 38 for providing system configuration information to the CCS-IP 10. A master console 39, including a display 40 and a keyboard 41, communicates with the interface 38 via a link 42. The master console 39 is utilized to configure the CCS-IP 10 in accordance with the requirements of the network 11. Linkset and network point identification information is entered in accordance with the network configuration. Linkset monitoring and parameter control data is entered at the master console 39 in accordance with requirements of the applications 24 and in accordance with particular specifications of the RBOC.

In a manner to be described, the master console 39 is utilized to configure MSU filtering to provide filtered and screened MSU subsets to the respective applications 24 so that an application only receives MSUs of interest.

Each of the data servers, such as the server 21, includes a console (not shown) similar to the console 39 for providing configuration and control inputs at the RBOC remote sites at which the respective servers are located.

With continued reference to FIG. 3, the T1 link connections 17 and 18 from the network 11 terminate at ports 50 of the NIP 20. The relationship between the T1 channels, the linkset identifiers of the network 11 and the T1 inputs of the ports 50 are provided by the RBOC and entered into the CCS-IP 10 via the master console 39. This configuration data is stored in configuration tables 51 in the NIPs, the data servers and the master station of the CCS-IP. The information is entered via the user interface 38 on communication paths 52. The linkset of the network 11 from which an SU is copied is uniquely identified by the T1 port and channel.

The raw T1 channelized SS7 SUs received at the ports 50 are applied to a link message structure function 53 that formats each SU into a link message structure. The link message structure will be described below with respect to FIG. 4. The SU data of the message starting with BSN is stored at an addressable location in SU data 54. The link message structure 53 for an SU includes a pointer to the SU data stored in SU data 54.

The NIP 20 includes an SU filter 55 for distinguishing between FISUs, LSSUs and MSUs. The SU filter 55 inspects the LI field of the SU for this purpose. The SU filter 55 accesses the SU data 54 for to obtain the LI of the SU being tested. If only MSUs are of interest, the SU filter 55 determines if the LI is at least 3. Although not shown in the figure, if the SU of interest is not an MSU message, a switch is included in the SU filter 55 for appropriately directing the LSSUs and FISUs for use by applications requiring these SU types.

The NIP 20 includes MSU filter structure and elements 56 for filtering the MSUs in accordance with linkset, application, MSU category and MSU type within a category. The MSU filter structure and elements 56 filters the MSUs into groups of interest to the applications 24, respectively, formatting and directing the MSU groups to the respective applications via paths 57, 58 and 59. The configuration tables 51 provide the MSU filter structure and elements 56 with the system configuration information for correlating received MSUs with the linksets of the network 11 from which they were copied. The MSU filter structure and elements 56 accesses the SU data 54 to compare the incoming MSUs against the filters so as to provide the desired groups on paths 57–59. The MSU filter structure and elements 56 will be described in detail below with respect to FIGS. 5–7.

The NIP 20 includes a filter manager 65 for controlling the MSU filter function and for changing the filter structure and elements in a manner to be described. Details of the filter manager 65 will be described below with respect to FIGS. 8 and 9.

As described above, the applications 24 on the application data server 21 receive the grouped MSUs on the paths 57–59. The applications 24 provide respective outputs to the interface 26 via paths 70, 71 and 72. The server 21 includes filter structure and elements 73 which are utilized in the CCS-IP 10 in downloading and changing the filters of the NIP 20. The filter structure and elements 73 is responsive to the configuration tables 51 of the server 21 for the reasons discussed above with respect to the configuration tables 51 of the NIP 20. The filter structure and elements 73 will be described in detail below with respect to FIGS. 12, 13a and 13b.

The server 21 includes a filter manager 74 which is structured and functions in a manner similar to that described above with respect to the filter manager 65.

The master station 34 includes filter structure and elements 80 utilized in downloading and changing the MSU filtering with respect to the data servers, such as the server 21, of the CCS-IP 10. Details of the filter structure and elements 80 will be described below with respect to FIGS. 10, 11a, 11b and 11c. The configuration tables 51 of the master station 34 provide linkset information to the filter structure and elements 80 for reasons similar to those described above with respect to the configuration tables 51 of the server 21 and the NIP 20.

The master station 34 also includes a filter manager 81 for controlling and changing the filter structure and elements 80. Filter changes entered at the master console 39 through the user interface 38 are entered into the filter structure and elements 80 via the filter manager 81. These changes are downloaded to the filter structure and elements 73 of the data server 21 via the filter manager 74 and to the MSU filter structure and elements 56 of the NIP 20 via the filter manager 65. The other servers and NIPs of the CCS-IP 10 also receive the downloaded filter information via the WAN 35 and the interfaces between the servers and the NIPs.

The embodiment of FIG. 3 was explained in terms of a CCS7 network of an RBOC. It is appreciated that the invention, as described, is generally applicable to any providers of CCS7 networks, such as Interexchange Carriers (IXC), wireless network providers and the like.

Referring to FIG. 4, with continued reference to FIG. 3, details of the link message structure 53 of the NIP 20 are illustrated. The size of the fields indicated is in bytes. The link message structure includes a message identification field 100 for administrative purposes. The structure includes a timestamp field 101 providing the time in milliseconds since midnight when the SU was received. The timestamp is derived from the time standard 30 through the time sync link 31. A channel number field 102 contains the T1 channel number on which the SU was received. The channel number is derived from the T1 interface of the NIP 20. The link message structure includes an SU length field 103 containing the length of the SU data. A field 104 contains a pointer to the location in SU data 54 storing the SS7 SU data starting with BSN.

Referring to FIG. 5, with continued reference to FIG. 3, the filter structure of the MSU filter structure and elements 56 of the NIP 20 is illustrated. The MSU filter structure comprises linked lists 110 of filter elements 111. The linked lists 110 originate at respective linkset filter elements 112. A link filter array 113 indexed by T1 link channel number points to the linkset elements 112. The 24 channels of a T1 link are schematically illustrated at 114. Correlation between specific T1 channels and CCS7 linksets is schematically illustrated by arrows 115.

Referring to FIGS. 6a, 6b and 6c, with continued reference to FIGS. 3 and 5, details of the elements of the MSU filter structure of FIG. 5 are illustrated. FIG. 6a illustrates a link filter array element 113. The element 113 includes a field 120 containing a pointer to the first linkset filter element 112.

FIG. 6b illustrates the linkset filter element 112. The linkset filter element 112 includes a field 121 containing the Signaling Link Set (SLS) index number of the linkset with which the element is associated. The index number is provided by the configuration tables 51. The linkset filter element 112 also includes a field 122 containing a pointer to the first filter element 111.

FIG. 6c illustrates the details of each filter element 111. The filter element 111 includes a field 123 containing an identification of the application with which the filter element 111 is associated. The filter element 111 also includes a field 124 containing the code of the MSU category to be filtered by the element. A field 125 of the filter element 111 contains a bit map of the MSU message types within the MSU category designated in the field 124 that are to be filtered by the filter element 111. The MSU message type field 125 is preferably implemented as a 32 byte bit map where the bits of the 32 bytes represent the respective message types within the message category of field 124. The bits corresponding to the message types to be filtered are set on. The filter element 111 also includes a field 126 containing a pointer to the next filter element 111 in the linked list 110 (FIG. 5) of filter elements.

With continued reference to FIGS. 6a, 6b and 6c, the channel field from the link message structure (FIG. 4) is utilized to index the link filter array 113. The indexed link filter array element 113 contains the pointer 120 to the linkset filter element which provides the system SLS index of the linkset being monitored. The linkset filter element 112 includes the pointer 122 to the first active filter element 111 in the linked list 110 (FIG. 5) of filter elements for the linkset designated by the linkset filter element 112.

The present invention accommodates configurations where filtering is performed by SS7 link as well as by linkset. In that arrangement, an additional pointer is added to the link filter element 113 that points to another linked list 110 of filter elements 111 only for that link. The filtering process then checks all filters for the link, then all filters for the link's linkset.

As discussed above, the MSU filtering for MSU category and type within category is done in the MSU filter structure and elements 56 of the NIP 20 of FIG. 3. The link message structure of FIG. 4 is applied to the MSU filter structure and elements 56 which obtains the data for the associated MSU from the location of SU data 54 pointed to by field 104 of the link message structure. Each MSU is compared to each filter element 111 of the linked list 110 pointed to by the linkset filter element 112. The message category code in field 124 of the filter element 111 is compared to the message category in the SI field of the MSU. If a match occurs, the message type in the SIF field of the MSU is compared to the message type bit map of the filter element 111 to determine if the message type is on. If an MSU passes the tests of a filter element 111, the message is formatted and sent to the application designated in field 123 in a manner to be described. Thus, each incoming MSU from a CCS7 linkset is tested against each filter element 111 of the linked list 110 pointed to by the linkset filter element 112 for that linkset.

Figures 7, 8:
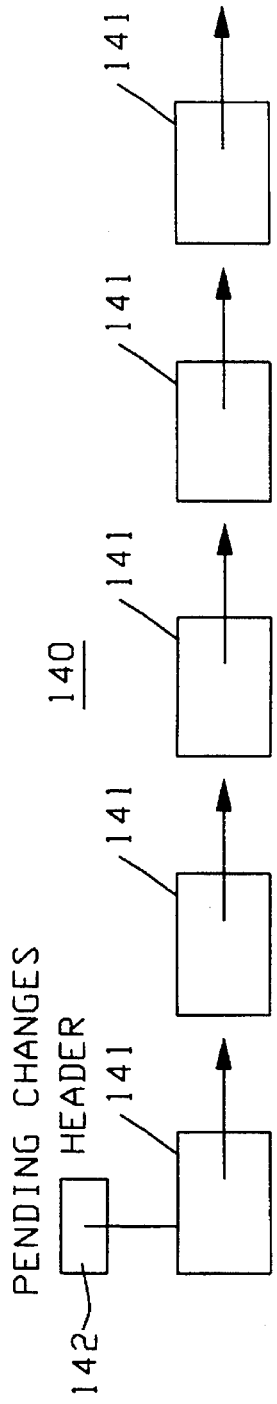
FIG. 7 is a diagram of the format of the data structure of the application message passed by the MSU filters of FIG. 5 to the applications running on the CCS-IP.
FIG. 8 is a diagram of the linked filter change structure utilized by the filter manager of the Network Interface Platform of the CCS-IP of FIG. 3.

When an MSU passes the tests of a filter element 111 it is formatted and transmitted to the application identified by field 123 of the filter element. Referring to FIG. 7, the application message format is illustrated. The application message includes a field 130 for containing an identifying header. A field 131 is utilized for the message category and is derived from field 124 of the filter element 111. A field 132 is utilized to denote the message type which is obtained by copying the message type from the appropriate byte of the message SIF field. A field 133 is utilized to contain the number of octets in the message data field. This includes the SIO and SIF fields from the MSU. The value is determined by counting the octets between successive flag fields on the signaling link.

A field 134 is utilized to contain the signaling linkset index and, as described above, is sent to the filtering function from the configuration tables 51 along with the MSU. The value is retrieved from the linkset filter element 112. A field 135 designates the direction, send or receive, of the MSU. As described above, the CCS-IP 10 is configured so that sending SS7 links are given odd numbered T1 channels, whereas receiving SS7 links are given even numbered T1 channels. The channel number is contained in field 102 of the link message structure of FIG. 4. A field 136 contains the timestamp of the message which is derived from field 101 of the link message structure of FIG. 4. A field 137 is utilized to contain the data field of the MSU which is comprised of SIO and SIF. The data field is derived from SU data 54 in accordance with the pointer of field 104 of the link message structure of FIG. 4.

The formatted application message of FIG. 7 is sent to the appropriate application utilizing the application identification of field 123 of filter element 111 (FIG. 6c) as the address of the application.

As described above with respect to FIG. 3, changes to the filters are effected at the master station 34 and downloaded through the appropriate server 21 to the appropriate NIP 20. The filter manager 65 of the NIP 20 effects the filter changes to the MSU filter structure and elements 56. Details of the filter manager 65 are illustrated in FIGS. 8 and 9.

Referring to FIG. 8, the filter change structure is illustrated. The structure comprises a linked list 140 of filter change elements 141 with an identifying header 142.

Referring to FIG. 9, details of the filter change element 141 are illustrated. A field 150 identifies the linkset, by linkset index number, of the filter in which the change is desired. A field 151 identifies the application for which the filter to be changed is utilized. Fields 152 and 153 designate the MSU category and MSU type, respectively, of the filter to be changed and a field 154 contains the time at which the change should become effective. A status field 155 indicates whether the change element is pending or active and an action field 156 designates the pending status of "no action pending", "to be added", "to be changed", or "to be deleted". A field 157 provides a pointer to the next filter change element 141 in the linked list 140.

The filter manager 65 receives filter changes from the filter manager 74 of the server 21 and stores the filter changes in the pending changes linked list of FIG. 8. The filter manager 65 periodically checks each pending filter change element 141 to determine if the effective time has expired, and if so, makes the changes in the change element 141 effective. Filter elements 111 are added or deleted from the linked lists 110 or changed in accordance with the actions and data specified in the change elements 141. When the change element 141 designates the "to be added" action, the new filter element 111 is added to the end of the list 110.

When the action designated in a change element 141 is completed, the change element is deleted from the linked list 140. The filter manager 65 considers the change elements 141 for potential activation in the order in which they appear in the linked list 140.

With continued reference to FIG. 3, the MSU filter structure and elements 56 are constructed, managed and modified by the filter manager 65 based on information downloaded from the master station filter manager 81 through the server filter manager 74. To implement this functionality, the master station 34 includes the filter structure and elements 80 controlled by the filter manager 81, and the server 21 includes the filter structure and elements 73 controlled by the filter manager 74. The filter structure and elements 73 and 80 are similar in configuration and content to those discussed above with respect to FIGS. 5, 6a, 6b and 6c. In addition, the server filter manager 74 includes filter change structure and elements similar to those discussed above with respect to FIGS. 8 and 9. Filter modifications are entered by users (e.g. application owners) via the master console 39 and the user interface 38 in a manner to be described.

Referring to FIG. 10, the master filter structure of the master filter structure and elements 80 is illustrated. The master filter structure is comprised of a plurality of filter elements 160 formed into linked lists 161 each of which originates at an application element 162 of an application linked list 163. Each application linked list 163 originates at a linkset filter element 164 in a signaling linkset array 165 that represents all signaling linksets in the system. The linkset filter array element 164 is indexed by linkset index number. Each element in the array 165 contains a pointer to the first application that has filters for the linkset.

Referring to FIG. 11a, the master linkset element 164 is illustrated. The linkset filter array 165 contains one master linkset element record 164 for each linkset of the system. The element 164 includes a field 170 containing a pointer to the application element 162 of the first application element in the linked application list 163.

Referring to FIG. 11b, details of the application element 162 are illustrated. The element 162 includes a field 171 containing the application ID and a field 172 contains the application status of on/off. The application status of field 172 indicates whether or not the application is active on the linkset. Filtering is not performed for applications that have been turned off. A field 173 contains an action indicator specifying whether the application is to be turned on or off at the effective time or if no action is pending for the application. A field 174 contains the effective time for turning the application on or off. A field 175 contains a pointer to the first filter element 160 in the associated filter element linked list 161. A field 176 contains a pointer to the next application element 162 in the application element linked list 163.

Referring to FIG. 11c, details of the master filter element 160 are illustrated. A field 180 contains the message category code of MSUs to be filtered. A field 181 contains a bit map of message types for designating MSU types within the MSU category of field 180. As discussed above with respect to the field 125 of FIG. 6c, the respective bits of the bit map denote the MSU types. A field 182 contains the effective time that an action pending against the filter element will be activated. A field 183 contains a status indicator designating whether an action is pending for the filter element or if it has been activated. A field 184 contains an action indicator denoting the type of action to be effected. A field 185 contains a pointer to the next filter element 160 in the linked list 161.

Figure 12:
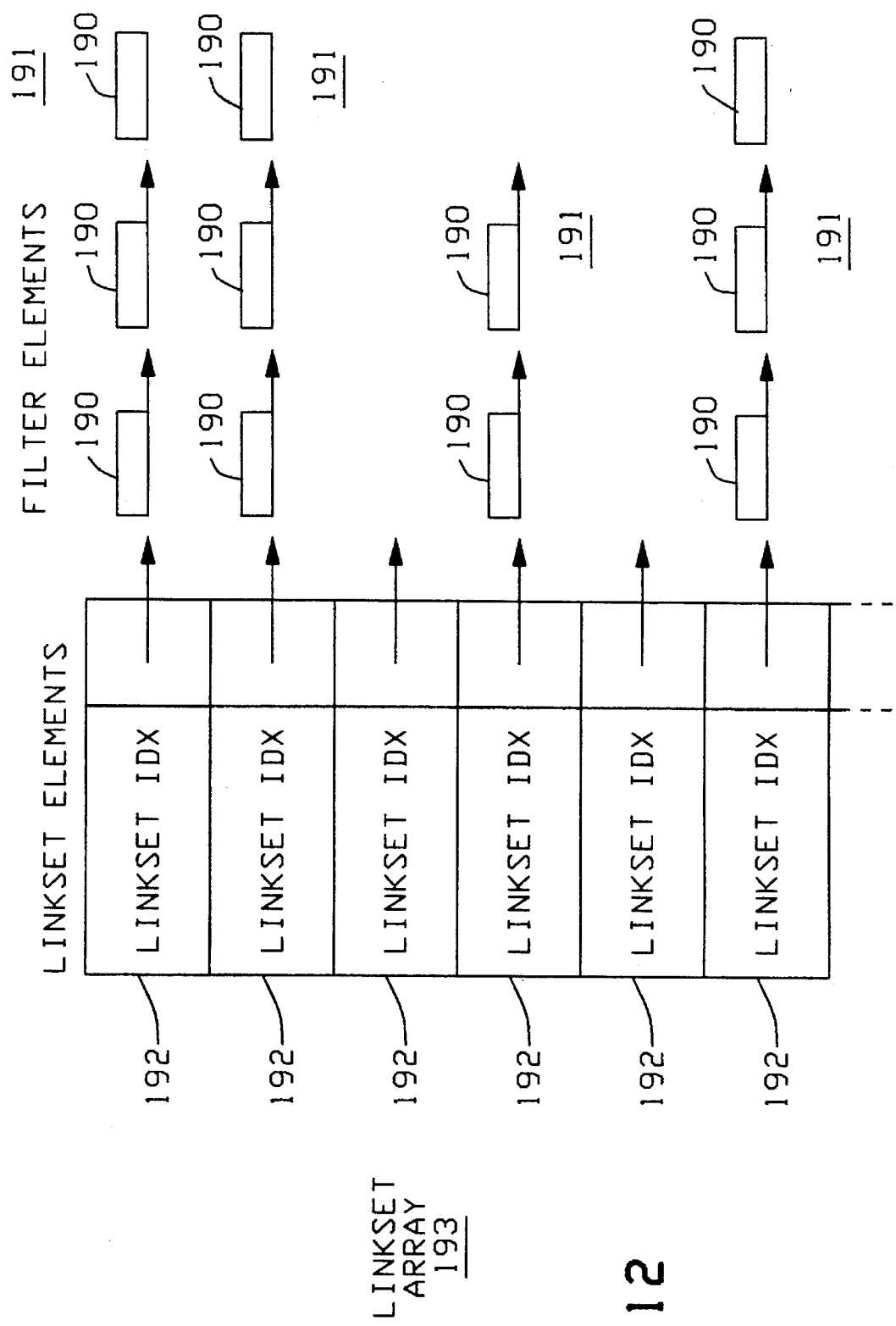
FIG. 12 is a diagram of the linked filter structure of the server filter structure and elements of the application data server of the CCS-IP of FIG. 3.

Referring to FIG. 12, the server filter structure of the server filter structure and elements 73 of the server 21 is illustrated. Filter elements 190 form linked lists 191 each of which originates at an element 192 in a signaling linkset array 193. The signaling linkset array 193 contains an element 192 for each linkset-near end point combination in the system. Each of the servers, such as server 21, of the CCS-IP 10, will only have filters for the linksets under its control.

Referring to FIGS. 13a and 13b, details of the elements 190 and 192 of FIG. 12 are illustrated. FIG. 13a illustrates the linkset filter array element 192 having a field 200 containing a pointer to the first filter element 190 for the linkset. The linkset array 193 has one linkset element 192 per linkset.

FIG. 13b illustrates the server filter element 190 which contains fields 201–204. The fields 201–204 are the same as fields 123–126 of FIG. 6c and are described above with respect thereto. The filter manager 74 of the server 21 also includes a filter change structure and elements constructed in the manner described above with respect to FIGS. 8 and 9.

Referring again to FIG. 3, the user interface 38 provides a menu driven procedure to a user at the master console 39 for entering filter and filter change information. A sequence of windows are displayed through which the user can navigate to enter the data. A main menu window (not shown) lists the applications on the CCS-IP 10 for user selection. When a user selects an application, a window (not shown) lists the linksets of the network 11 for which the selected application is configured and an edit option is provided in the window. When the user selects a linkset and the edit option, a further window provides the user with the option to edit the filters on that linkset for the selected application. This window is illustrated in FIG. 14.

Figure 14:
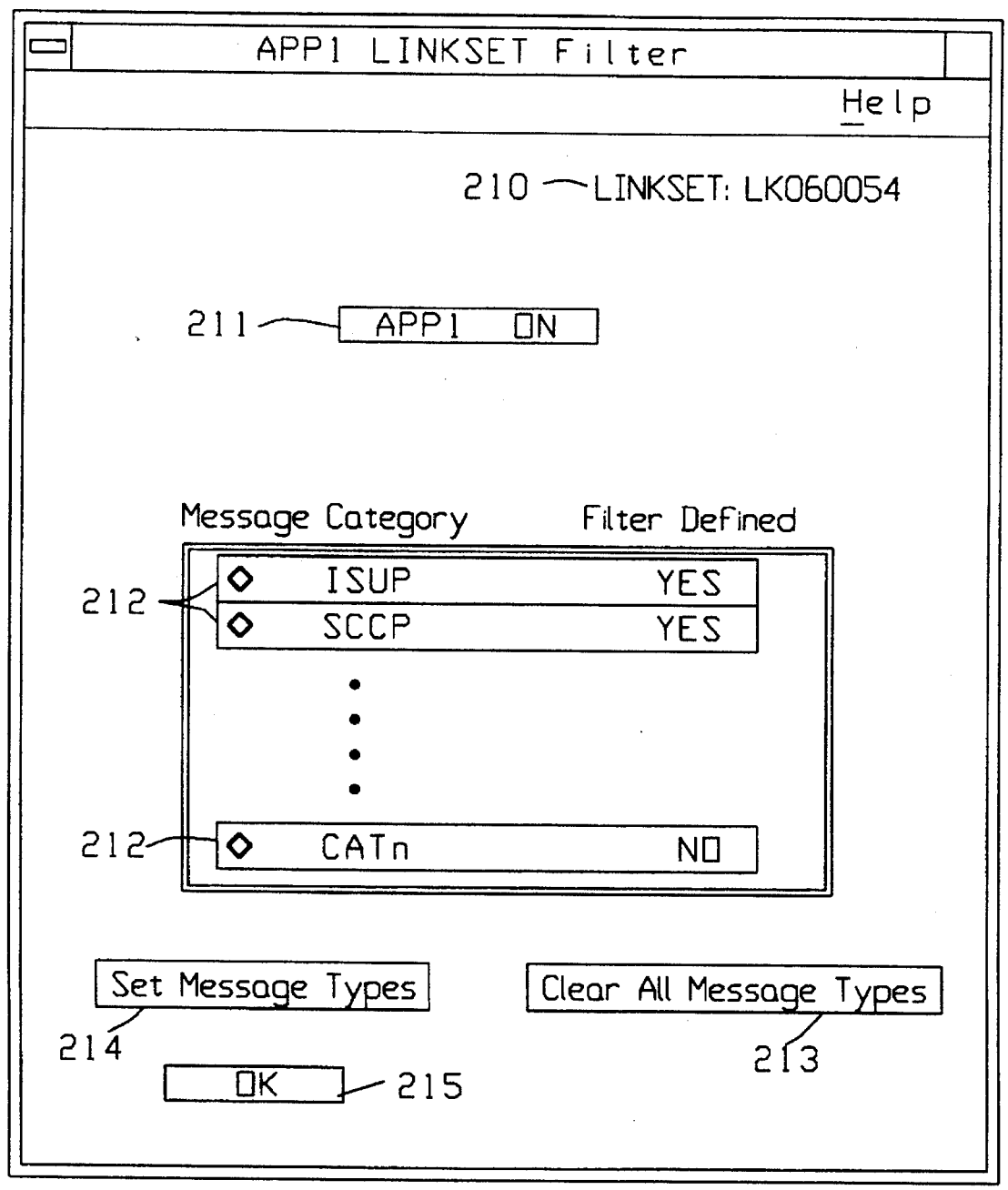
FIG. 14 is an illustration of a user interface window displayed on the master console of FIG. 3 for configuring the filter MSU category pursuant to an application and linkset.

Referring to FIG. 14, the top of the window displays the current application and the window title which, in this case, is Linkset Filter and a field 210 displays the identification of the selected linkset. A toggleable pushbutton 211 shows whether the selected application is on or off. The status of the application can be changed by toggling the pushbutton 211. Each message category is displayed and whether or not a filter has been defined for that category. Pushbuttons 212 permit the user to select a filter to add, change, or delete. To delete a filter, a pushbutton 213 is utilized. To add or change a filter, a pushbutton 214 is utilized. A pushbutton 215 is provided to enter desired values. Selecting the pushbutton 214 brings up the Linkset Filter Message Types window illustrated in FIG. 15.

Referring to FIG. 15, the top of the window displays the current application and the window title which, in this case, is Linkset Filter Message Types. The selected linkset is displayed in a field 220 and the selected message category is displayed in a field 221. A window 222 displays all of the message types associated with the selected message category and the on/off status of each message type for the selected linkset. The "Monitoring (ON/OFF)" toggle field permits the user to select ON or OFF for each message type. A scroll bar 223 permits scrolling through the message types. A pushbutton 224 is utilized to record the filter.

With continued reference to FIG. 3, when changes are to be made to filters through the user interface 38, the user interface 38 sends a message to the filter manager 81. The filter manager 81 receives the filter changes, sends the changes to the filter manager 74 and stores the changes by updating the master filter structure and elements 80. On server 21, the filter manager 74 receives the filter changes from the master station 34, sends the changes to the filter manager 65 and stores the changes by updating the server filter structure and elements 73. The filter manager 65 of the NIP 20 updates the MSU filter structure and elements 56 at the appropriate effective times.

From the windows on the master console 39, the user has the option to add, delete, and change message category or modify message types. The user of an application may also turn monitoring on or off for a selected linkset. These functions are effected from the windows illustrated in FIGS. 14 and 15. For example, pushbutton 211 turns monitoring on and off for the selected linkset and application. The filter manager 81 appropriately sets fields 172 and 173 of FIG. 11b.

Monitoring is turned on and off for a selected linkset and application without losing filters that have been created. When monitoring is turned off for a linkset and application, the appropriate filters are deleted from the structure of FIG. 5. When monitoring is turned back on, the appropriate filters are downloaded from the master station 34 and re-entered into the filter structure of FIG. 5.

It is appreciated from the foregoing, that the CCS-IP 10 of the present invention provides the capability to filter selected SU types and MSU categories and types so as to filter and forward messages to a plurality of concurrently deployed SS7 applications. SS7 messages are provided to whatever applications need to receive them, permitting the applications to decrease the volume of messages they receive by filtering out unwanted message categories and types. Preferably, filtering is by linkset or link and can be by any MSU category and any MSU type based on category. Upon receipt of a message which fulfills all filtering criteria for an application, the complete SU is provided to the application together with the timestamp, signaling linkset identification and send/receive indication (see FIG. 7).

It is appreciated from the above descriptions of the filter structure and elements, that a framework is provided to facilitate adding applications to the application set 24. The described mechanisms for adding SU and MSU filtering for new applications facilitates adding applications to the platform.

Typical application software programs that may be deployed on the CCS-IP 10 (applications 24, FIG. 3) are as follows.

A Usage Measurement (UM) application may be deployed by an RBOC to determine the MSU traffic sent and received on the peripheral links of its CCS7 network 11. These peripheral links may be rented by, for example, other telephone companies. Aggregate counts of MSUs meeting predetermined criteria may be provided in such a UM application. For this UM application, the SU filter 55 would pass only MSUs and the MSU filters 56 would only monitor the peripheral links and would pass only ISUP messages of pre-selected types and SCCP Unitdata or Unitdata Service messages with a TCAP portion.

Another application may involve End Office Integration (EOI) where the RBOC is interested in conversation time or access time for calls originating from an Alternate Exchange Carrier (AEC) end office that complete through a tandem office of the RBOC either to an Interexchange Carrier (IXC) or to another end office in the LATA. For such an application, the SU filter 55 would pass only the MSUs. The MSU filters 56 for the EOI application would only monitor linksets originating from an AEC and would pass ISUP messages of the IAM, ACM, ANM, and REL types.

An RBOC may desire to deploy a Network Surveillance and Monitoring (NSM) application which would require that all linksets of the RBOC CCS7 network 11 be monitored. The filters 55 and 56 would pass all SUs to this application.

A Fraud Detection and Prevention (FDP) application may involve the ISUP MSUs of selected types (IAM, ANM, REL) as well as SCCP MSUs of TCAP query and response types.

While the invention has been described in its preferred embodiments, it is to be understood that the words which have been used are words of description rather than of limitation and that changes may be made within the purview of the appended claims without departing from the true scope and spirit of the invention in its broader aspects.

We claim:

1. A platform for use with a Common Channel Signaling System No. 7 (CCS7) network which transports SS7 Signal units (SU) therethrough, wherein an SU can be of an SU type including a Fill-In Signal Unit (FISU) type, a Link Status Signal Unit (LSSU) type or a Message Signal Unit (MSU) type, wherein an MSU can be of an MSU category that is one of a plurality of MSU categories, said platform supporting a plurality of concurrently executable application software programs for processing SUs in accordance with diverse application functionality, respectively, said platform comprising:

input interface means for receiving copies of said SUs from said CCS7 network, and filtering means for separating said SUs into groups of MSUs of interest to said plurality of application software programs, respectively, said filtering means including SU filter means responsive to said copied SUs for passing said MSUs, said filtering means further including MSU filter means responsive to said MSUs passed by said SU filter means for separating said MSUs into said groups in accordance with said MSU category, said platform operative to direct said groups to said application software programs, respectively.

2. The platform of claim 1 wherein an MSU of an MSU category can be of an MSU type within said MSU category, said MSU filter means being further operative to separate said MSUs into said groups in accordance with said MSU type.

3. The platform of claim 2 wherein said CCS7 network includes signaling linksets for transporting said SUs, said MSU filter means comprising:

a plurality of linked lists of filter elements, each linked list being associated with one of said linksets, each said filter element including a field for identifying one of said application software programs, a field for identifying said MSU category and a field for identifying said MSU type, said MSU filter means being operative for comparing said MSUs passed by said SU filter means with said filter elements so as to separate said MSUs into said groups.

4. The platform of claim 3 wherein said field identifying said MSU type comprises a bit map of MSU types where each bit of said bit map represents a separate MSU type.

5. The platform of claim 4 wherein said MSU filter means is operative to separate an MSU into a group based on said field identifying one of said application software programs.

6. The platform of claim 3 further including:

user interface means for entering filter change data into said platform, and filter change means for entering said filter change data into said filter elements.

7. The platform of claim 6 wherein said filter change data relates to said application software programs, said MSU categories and said MSU types, said filter change means being operative to enter said filter change data into said fields of said filter elements in accordance with said application software programs, said MSU categories and said MSU types.

8. The platform of claim 6 wherein said filter change data includes linkset related data, said filter change means being operative to modify said MSU filter means in accordance with said linkset related data.

* * * * *